US007516210B2

(12) United States Patent
Liscano et al.

(10) Patent No.: US 7,516,210 B2
(45) Date of Patent: Apr. 7, 2009

(54) ROLE-BASED PRESENCE ENABLED SERVICE FOR COMMUNICATION SYSTEM

(75) Inventors: Ramiro Liscano, Ottawa (CA); Kathy Baker, Ottawa (CA); Natalia Balaba, Ottawa (CA); Jun Zhao, Hamilton (CA)

(73) Assignee: Mitel Networks Corporation (CA)

( * ) Notice: Subject to any disclaimer, the term of this patent is extended or adjusted under 35 U.S.C. 154(b) by 837 days.

(21) Appl. No.: 10/631,794

(22) Filed: Aug. 1, 2003

(65) Prior Publication Data

US 2005/0102389 A1 May 12, 2005

(30) Foreign Application Priority Data

Aug. 12, 2002 (GB) ................................ 0218707.8

(51) Int. Cl.
*G06F 15/173* (2006.01)

(52) U.S. Cl. ...................................... 709/224; 709/201

(58) Field of Classification Search ................. 709/201, 709/224, 229, 223
See application file for complete search history.

(56) References Cited

U.S. PATENT DOCUMENTS

| | | | | |
|---|---|---|---|---|
| 5,826,039 | A | 10/1998 | Jones | |
| 6,697,840 | B1 * | 2/2004 | Godefroid et al. | 709/205 |
| 6,735,717 | B1 * | 5/2004 | Rostowfske et al. | 714/13 |
| 2003/0163513 | A1 * | 8/2003 | Schaeck et al. | 709/201 |
| 2004/0019799 | A1 * | 1/2004 | Vering et al. | 713/200 |

FOREIGN PATENT DOCUMENTS

| | | | |
|---|---|---|---|
| GB | 2 301 983 | A | 12/1996 |
| WO | WO 97/39566 | | 10/1997 |
| WO | WO 01/45342 | A | 6/2001 |
| WO | WO 02/054745 | A1 | 7/2002 |
| WO | WO 02/059804 | A1 | 8/2002 |

OTHER PUBLICATIONS

IETF RFC 2778, by M. Day et al, “A Model for Presence and Instant Messaging”, pp. 1-17.
K. Izaki et al, “Information Flow Control in Role-Based Model for Distributed Objects”, Proc. Int. Conf. Parallel Distributed systems ICPADS, p. 363-370, 2001.

* cited by examiner

*Primary Examiner*—Ario Etienne
*Assistant Examiner*—El Hadji M Sall

(57) ABSTRACT

A system for providing role-based Presentity availability information to a Watcher, comprising at least one Presentity User Agent for issuing a request to register a Presentity in at least one of a plurality of roles, and for generating context messages relating to changes in context of the Presentity. At least one Watcher User Agent is provided for issuing a role-based subscription request for the availability information. A Presence Service is provided for maintaining role-based Watcher subscriptions and issuing availability messages in response to generation of the context messages. A Role Manager is provided for (i) receiving each request to register a Presentity in a role and in response managing Presentity registration in that role, and (ii) receiving each role-based subscription request, and in response managing each role-based Watcher subscription to the availability information within the Presence Service.

4 Claims, 4 Drawing Sheets

ROLE-BASED PRESENCE ENABLED SERVICE FOR COMMUNICATION SYSTEM

FIELD OF THE INVENTION

This invention relates generally to presence systems for indicating the availability of a person for communication, and more particularly to a method and apparatus for subscribing to the availability of a user in a particular role.

BACKGROUND OF THE INVENTION

A presence service allows users of the service to "Subscribe" to another person's availability. Users that view another person's availability are called "Watchers". The user that projects their availability is called a "Presentity". This is in conformance with the definitions used in IETF RFC 2778 on the Common Profile for Instant Messaging. A positive or negative acknowledgement to a subscription request is based on a set of availability notification policies that the Presentity can define.

Presence services currently offer two user capabilities:

1. Projection of Availability. This is the traditional user's availability information. It is an indication of the person's desire or willingness to communicate. The availability information is projected to other users. If the person is willing to communicate they will appear available. Otherwise, they appear as unavailable.
2. Communication Contact Information. This second type of information reflects how, where or by what means the person is available for communication. The contact information describes different communication service types that the person is currently available on. Examples of such communication types include telephony, Instant Messaging, chat, video streaming, etc.

The inventors are aware of no literature on the use of roles for presence systems. All of the known presence systems deal solely with the availability of users rather than with abstract concepts like roles. Roles have, however, been used in other systems that are unrelated to user communications. For example, the American National Institute for Standards and Technology (NIST) has investigated Role-Based Access Control (RBAC), as described in U.S. Pat No. 6,023,765 (Kuhn) entitled Implementation of role Based Access Control in Multi-level Secure Systems. Most of this work though relates to security and access control for groups and persons in particular roles. For presence services, SUN's iPlanet Messaging Server [Sun Microsystems] claims to support the creation of groups, users and roles but does not provide the ability to subscribe to users in particular roles. Products also exist that use roles for workflow management [See K. Izaki, M. Takizawa, and K. Tanaka, Information Flow Control Role-Based Model for Distributed Objects, Proc. Int. Conf. Parallel Distributed Systems ICPADS, p 363-370, 2001" and J. Barkley, "Workflow Management Employing Role-Based Access Control". U.S. Pat. No. 6,088,679, December 1997]. However, these products though do not leverage or reflect user availability, as is required in presence systems.

SUMMARY OF THE INVENTION

A key aspect of the present invention is the capability to subscribe to a user's availability based on a role. As indicated above, this is a feature not available in current presence services. According to a first embodiment of the invention, a User-centered implementation of role availability is effected, whereas a second embodiment is a User-independent implementation. For both embodiments, role-based presence is deployed using a group entity communicating to a presence.

BRIEF DESCRIPTION OF THE DRAWINGS

A detailed description of the invention is set forth herein below, with reference to the following drawings, in which.

DETAILED DESCRIPTION OF THE PREFERRED EMBODIMENT

Figure 1:
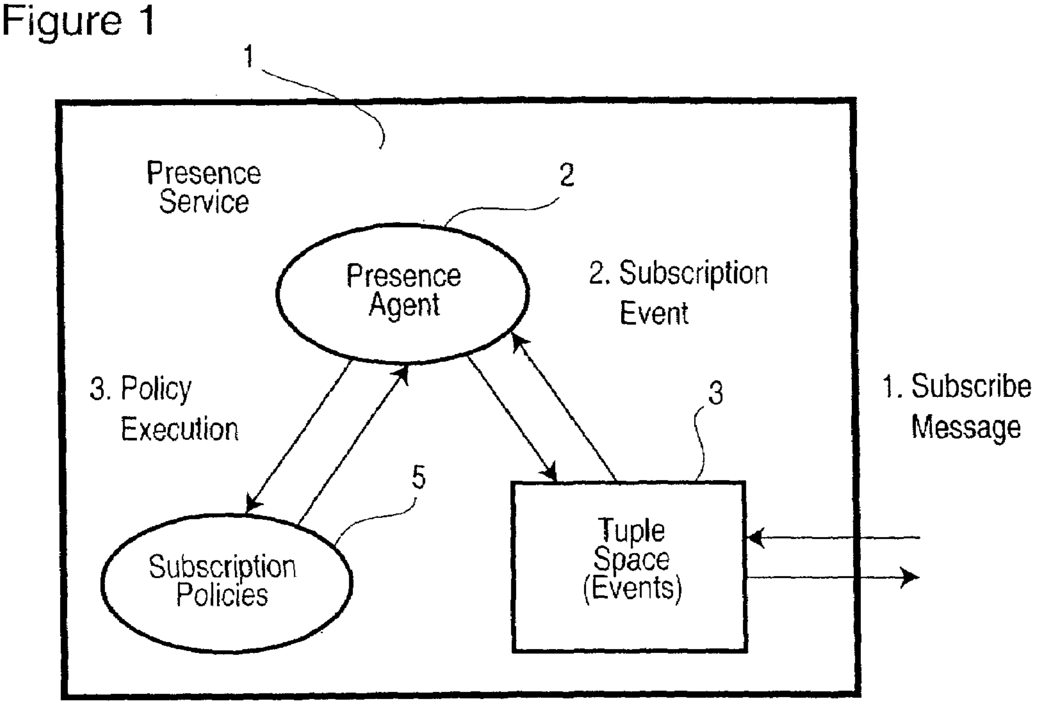
FIG. 1 is a component relationship diagram of a presence system showing subscription of a Watcher to a Presentity.

FIG. 1 is a component relationship diagram of a presence system, showing message sequences. The software entities that manage a person's availability in a Presence Service 1 are called Presentity Presence Agents (PA 2). Each PA 2 maintains a user's presence policies and reacts to either "Subscription" or "Notification" events published by a Tuple Space 3. A subscription event is an event that occurs when a Watcher subscribes to a Presentity. This has the effect of triggering a set of subscription policies 5 that confirm or reject a Watcher's subscription request.

Figure 2:
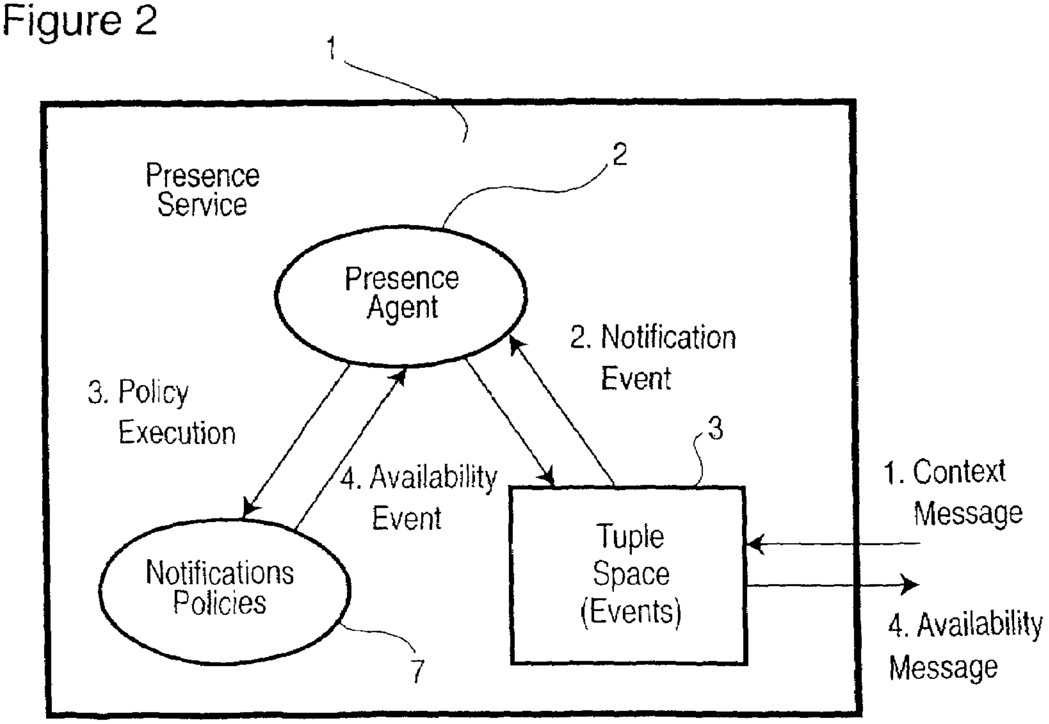
FIG. 2 is a component relationship diagram of a presence system showing notification of a change in context of a Presentity.

A notification event occurs any time a Presentity's context changes (i.e. the Presentity's activity, location, role, or status triggers a notification event). Policies are required to determine which Watchers will receive a Presentity's availability when their context changes. Because a Presentity's role may vary often and a user may take on several roles simultaneously, it is not possible to deal with a Presentity's role using subscription policies. Thus, the present invention uses notification policies 7, as shown in FIG. 2.

According to a first embodiment of the present invention, user-centered management of roles is provided for allowing a Watcher to subscribe to a user in a particular role. According to a second user-independent embodiment, the Watcher subscribes to a role irrespective of what particular user might register for that role.

According to the first embodiment, a role definition is provided in the subscribe message, as follows:

1. <event
2. type=subscription
3. subtype=subscribe|unsubscribe
4. originator=Watcher@domain.com
5. receiver=Presentity@domain.com
6. role=role/>

Figure 3:
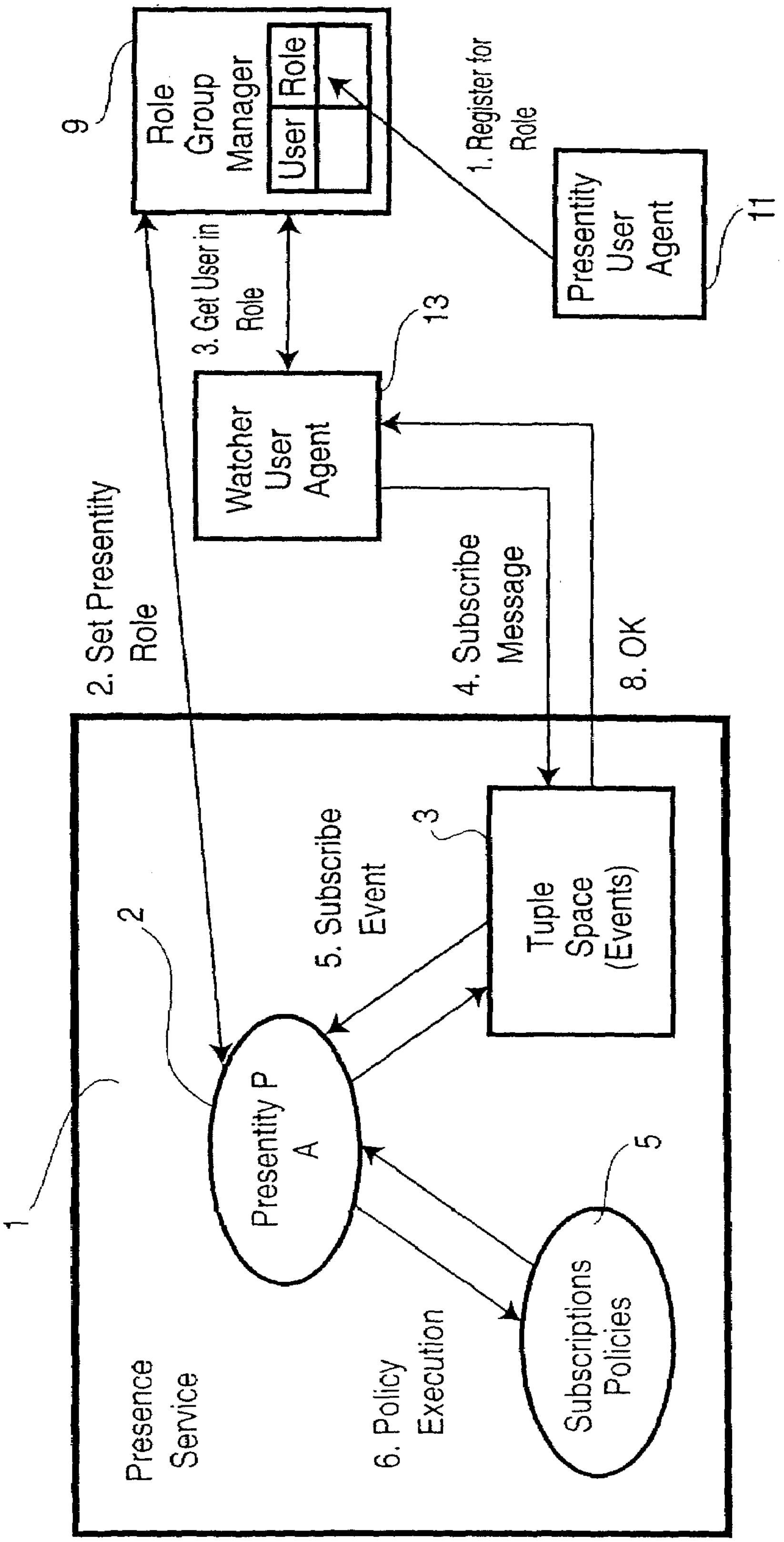
FIG. 3 is a component diagram showing management of subscriptions to a user in a particular role by a group manager, according to a first embodiment of the invention.

The Presence Agent 2 replies positively to any role subscription since it never actually knows when a user will register for a particular role. As shown in FIG. 3, management of subscriptions to a user in a particular role is performed by a Group Manager 9. A Presentity User Agent 11 (i.e. a software agent representing the Presentity in the system) registers with the Group Manager 9 for a particular role. The Group Manager 9 is a software application that receives requests for users desirous of registering in predetermined roles, and setting roles for each Presentity in the associated Presence Agents 2. This is required so that a role type of notification policy will work effectively. When a Watcher User Agent 13 wishes to subscribe to a user in a particular role it issues an HTTP GET request to the Group Manager 9 to get a list of available groups and their members. This is a two-step process. First, a request is sent to get the groups, as follows:

(http://serveraddress/servlet/com.mitel.presence.events.utils.GMSServlet?event=list)

and the following reply is returned:

```
<reply event='list_group' value='success'>
    <group name=group1/>
    <group name=group2/>
    <group name=group3/>
    <group name=group4/>
</reply>
```

and then a request is sent to get the members of a particular group:

(http://serveraddress/servlet/com.mitel.presence.events.utils.GMSServlet?event=get&group=GroupName)

with the following reply:

```
<reply event='get_group' value='success'>
    <user name=user1@domain.com/>
    <user name=user2@domain.com/>
    <user name=user3@domain.com/>
    <user name=user4@domain.com/>
</reply>
```

This results in a Subscribe event that is processed by PA 2 in accordance with Subscription Policies 5. The successful subscription is posted back to the tuple space 3 by Presentity Agent 2, resulting in an acknowledgement to Watcher User Agent 13.

Figure 4:
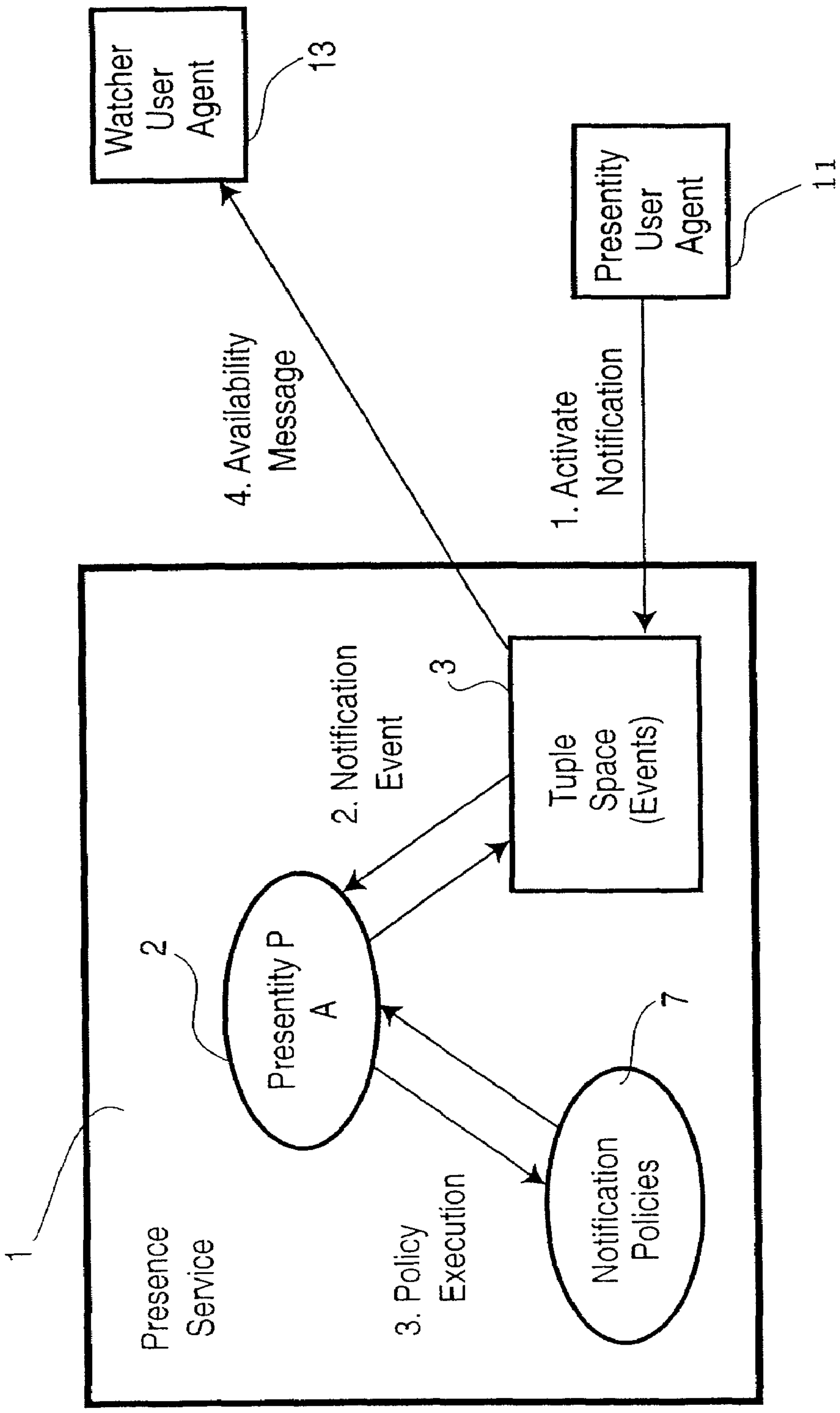
FIG. 4 is a component diagram showing control of Presentity availability in a particular role using a notification policy that includes a role switch, according to the first embodiment of the invention.

As shown in FIG. 4, Presentity User Agent 11 posts a Notification message to the tuple space 3 in response to a change in the user's context within the defined role. The tuple space 3 responds with a Notification Event. Presentity PA 2 executes an appropriate one of the Notification Policies 7 and posts the result back to the tuple space 3. The Watcher User Agent 13 that has subscribed to the user in the selected role is then notified via an Availability Message from tuple space 3. The Presentity is able to control his/her availability in a particular role using a Notification Policy that includes a role switch. An example of such a Notification Policy is shown below.

```
1. <papl id='10558' name='NurseRole' priority='3'>
2. <notification-event>
3. <role-switch>
4. <role name='Nurse'>
5. <availability value='available'>
6. <notify/></availability></role></role-switch>
7. </notification-event>
8. </papl>
```

In this particular example the user is available if he/she is in the Nurse role as reflected in line 4 of the policy. Line 4 of the policy defines the role that the role-switch will trigger on. If the user is in the role "Nurse" the policy is valid. Lines 3, 4, and 5 of the policy are equivalent to the following human readable statement:

If user-role equals Nurse then availability value equals available.

After the policy executes, each Watcher that has subscribed to the user in the Nurse role is notified of the Presentity's availability, as discussed above. It will be noted that the Role Group Manager 9 does not participate in the availability notifications.

Figure 5:
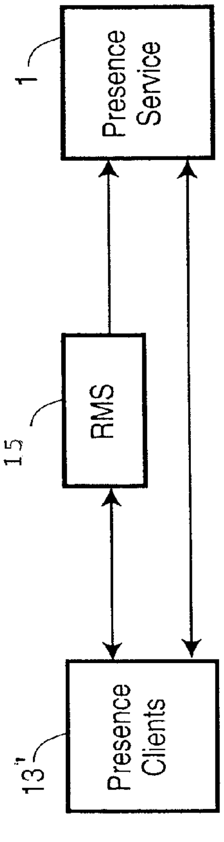
FIG. 5 is a block diagram of a second embodiment of the invention incorporating a Role Management Service that allows Watchers to subscribe to particular roles without knowing the user.

The user-centered approach to defining roles for Presence requires that Watchers know the identity of the person whose availability they wish to subscribe to (i.e. line 5 of the subscribe message). According to the second embodiment of the invention depicted in FIG. 5, there is no requirement that the Watchers know the user's identification. This capability is managed by defining a Role Management Service (RMS 15) that allows Watchers to subscribe to particular roles without knowing the user. Thus, according to this embodiment, the responsibility of role management is removed from the Presence Service 1 and is assumed instead by the RMS 15. The Presence Service 1 still deals with the notification of availability and execution of individual user policies, and the Presence Clients 13'(i.e. Presentity User Agent 11 and Watcher User Agent 13) continue to interact with the presence service 1 to access any user policies and to send user oriented subscriptions.

The RMS 15 functions as a third-party application to the Presence Service 1, acting on behalf of the Watcher that has subscribed to a particular role. The RMS interacts with the Presentity's User Agents 11 registered in that role in two ways. First, it manipulates the Presentity's subscription policies using a special type of subscription event called "Subscribe-role" event (discussed below), and sets the Presentity's notification policies so that the Watcher receives periodic updates of the Presentity's availability while the Presentity is registered in a particular role.

In order for management of subscriptions to be performed by the RMS 15, rather than the Presence Clients 13', the subscribe message from the Watcher User Agent 13 (i.e. Subscribe-role) includes a role to divert the message to the RMS 15, as follows:

```
1. <event
2. type=subscription-role
3. subtype=subscribe|unsubscribe
4. originator=watcher@domain.com
5. role=role/>
```

The RMS 15 recognizes the role specified in the event and in response returns a confirmation to the Watcher. Thus, the RMS 15 is responsible for maintaining a list of Watchers that are subscribed to a role.

Figure 6:
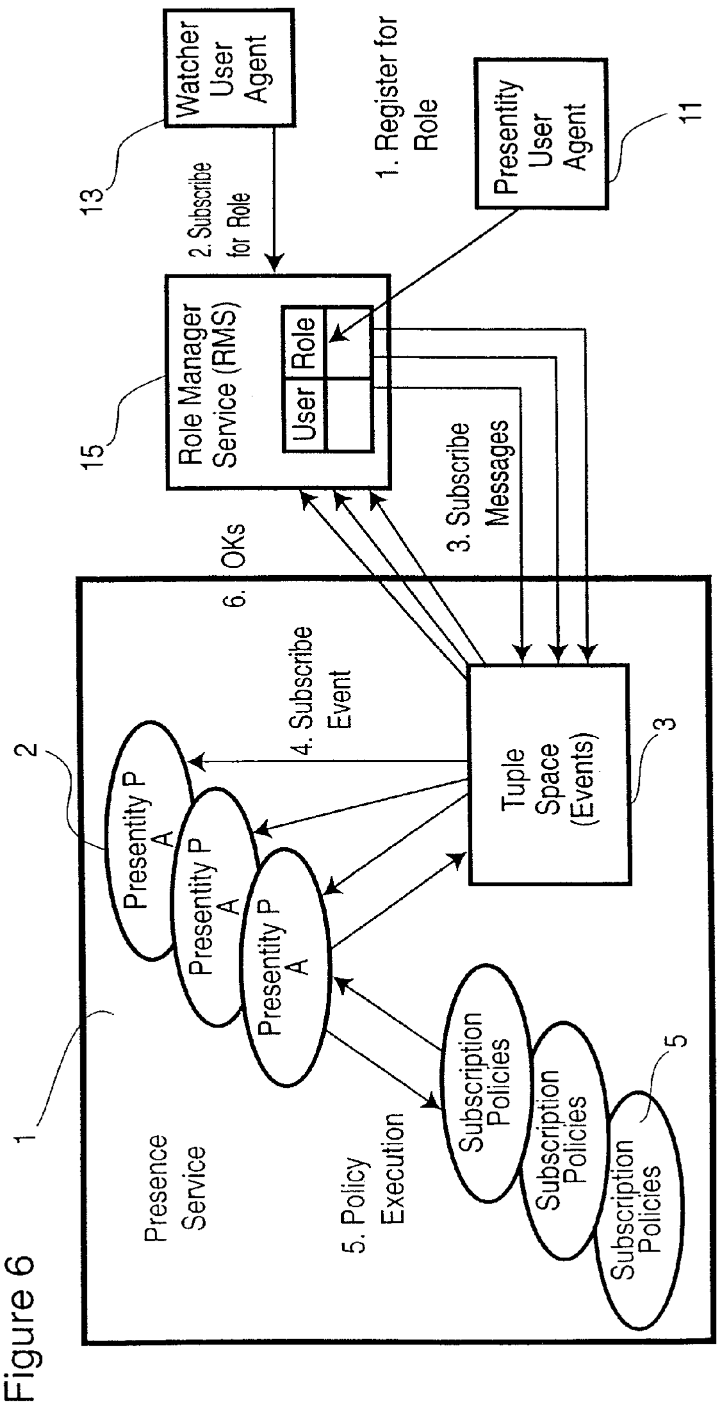
FIG. 6 is a component diagram showing management of subscriptions by the Role Management Service, according to the second embodiment of the invention.

The RMS 15 sends Subscribe requests on behalf of the Watcher to each user's Presence Agent 2 that is registered in the role that the Watcher is subscribed to, as shown in FIG. 6.

When a new user registers for the role a new Subscribe request is sent to this user's Presence Agent. When a user removes him or herself from a role each Watcher of that role is unsubscribed from the Presence Agent 2 of that user.

Notifications are handled by the Presentity Presence Agents 2 in the manner discussed above with reference to FIG. 4 (i.e. the RMS 15 is not involved). However, the RMS must set the notification policies to ensure that a user will receive an availability notification event. As users register or de-register from roles the RMS 15 adds or removes the appropriate notification policy from the Presentity's User Agent 11. Since the Presentity Presence Agents 2 do not manage roles, these notification policies are user specific. The following is an example of such a notification policy.

1. <papl id='19160' name='test3' priority='2'>
2. <notification-event>
3. <watcher-switch>
4. <watcher name='Mary@mitel.com'>
5. <availability value='available' role=RMSRoles>
6. <notify/>
7. </availability>
8. </watcher>
9. </watcher-switch>
10. </notification-event>
11. </papl>

It is also important to note that in line 5 the policy defines a status line for setting the Presentity's role. This must be done so that the client can receive the availability message that includes the Presentity's role. The Watcher receives a notification with the roles defined by the string value RMSRoles. When a Presentity removes his/her name from a role the RMS 15 must remove the Notification Policy from the Presentity User Agent 11.

Thus, in accordance with the present invention role-based availability may be implemented in a presence system. One application of the present invention is the tracking of experts in an organization. User's can register or be automatically registered as experts that can be modeled as a role. Another potential application is in situational contexts where persons assume particular roles for periods of time. For example, a teacher can be in a teaching role when in class and can therefore be available to particular persons from that class. Similarly, in medical applications doctors can take on particular roles in a hospital.

Modifications and variations to the invention are possible, all of which are believed to be within the sphere and scope of the present invention as defined by the claims appended hereto.

The invention claimed is:

1. A system for providing role-based presentity availability information to a watcher, comprising a processor and memory for implementing:

at least one presentity user agent for issuing a request to register a presentity in at least one of a plurality of roles, and for generating context messages relating to changes in context of said presentity;

at least one watcher user agent for issuing a role-based subscription request for said availability information;

a presence service for maintaining role-based watcher subscriptions and issuing availability messages in response to generation of said context messages;

a role manager for (i) receiving each request to register a presentity in said at least one at said plurality of roles and in response managing presentity registration in said plurality of roles, and (ii) receiving each said role-based subscription request, and in response managing each role-based watcher subscription to said availability information within said presence service;

wherein said presence service comprises:

a shared database stored in said memory for publishing a subscribe event and a notification event in response to receiving each said subscription request and context message, respectively; and at least one presence agent for receiving said subscribe event and in response triggering a set of subscription policies that either confirm or reject each of said role-based watcher subscriptions, and for receiving said notification event and in response triggering a set of notification policies to selectively generate said availability messages;

wherein said role manager is a role group manager for effecting user-centered management of roles by registering said presentity with said at least one presence agent in said at least one of said plurality of roles, and subscribing said watcher within said least one presence agent to said presentity in said at least one of said plurality of roles; and wherein said role-based subscription request identifies said presentify and includes a role definition therefor.

2. A system as claimed in claim 1, wherein each of said notification policies includes a role switch for presentity control of availability in said at least one of said plurality of roles.

3. A system for providing role-based presentity availability information to a watcher, comprising a processor and memory for implementing:

at least one presentity user agent for issuing a request to register a presentity in at least one of a plurality of roles, and for generating context messages relating to changes in context of said presentity;

at least one watcher user agent far issuing a role-based subscription request for said availability information;

a presence service for maintaining role-based watcher subscriptions and issuing availability messages in response to generation of said context messages;

a role manager for (i) receiving each request to register a presentity in said at least one of said plurality of roles and in response managing presentity registration in said plurality of roles, and (ii) receiving each said role-based subscription request, and in response managing each role-based watcher subscription to said availability information within said presence service;

wherein said presence service comprises:

a shared database stored in said memory for publishing a subscribe event and a notification event in response to receiving each said subscription request and context message, respectively; and at least one presence agent for receiving said subscribe event and in response triggering a set of subscription policies that either confirm or reject each of said role-based watcher subscriptions, and for receiving said notification event and in response triggering a set of notification policies to selectively generate said availability messages;

wherein said role manager is a role manager service for effecting user-independent management of roles by subscribing said watcher to said at least one of said plurality of roles irrespective of said presentity; and wherein said role-based subscription includes a role definition therefor.

4. A system as claimed in claim 3, wherein each of said notification policies includes a watcher switch for identifying said watcher and a status line for controlling availability of said presentity in said at least one of said plurality of roles.

* * * * *